March 19, 1929.  H. S. LEWIS ET AL  1,705,933
GEAR WHEEL
Filed Jan. 11, 1928
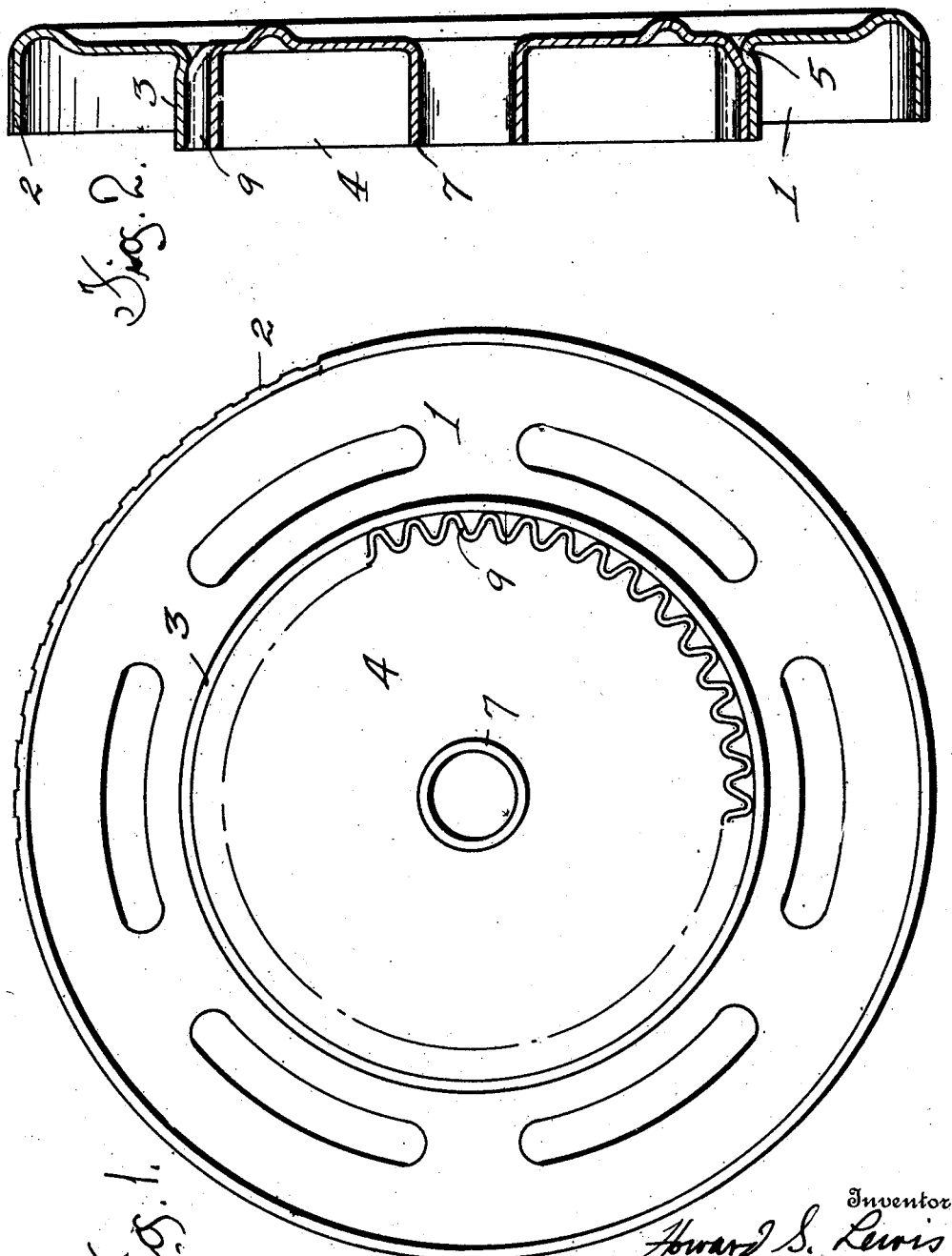
Inventor
Howard S. Lewis
and Charles Kachel
By
Attorney Patented Mar. 19, 1929.

1,705,933

UNITED STATES PATENT OFFICE.

HOWARD S. LEWIS AND CHARLES KACHEL, OF READING, PENNSYLVANIA, ASSIGNORS TO PARISH PRESSED STEEL COMPANY, OF READING, PENNSYLVANIA, A CORPORATION OF DELAWARE.

GEAR WHEEL.

Application filed January 11, 1928. Serial No. 245,965.

This invention relates to improvements in gear wheels, and it pertains particularly to the construction of wheels for use on lawn mowers, in which a toothed inner surface is required to accommodate a co-acting and rotatable member.

The invention contemplates a lawn mower wheel, made of sheet metal, preferably steel, and in which such geared surface is conveniently and accurately provided.

To this end we have devised a wheel, pressed from sheet steel, consisting of two annularly formed members, firmly fixed together by pressure, and in which the outer or tread member is formed with a flange and the inner member with a flange—the first serving as the wheel tread and the latter as the wheel hub—while both members are each provided with an additional flange and which, together, provide the means for firmly joining the two members fixedly together and also provide the surface on which the teeth are formed.

The invention is more fully described in the following specification and clearly illustrated in the accompanying drawing, in which:—

Figure 1 is an elevational view showing the inner side of the wheel.

Figure 2 is a central sectional view through Figure 1.

The numeral 1 designates the outer member and is formed with two inwardly pressed flanges, the one forming the tread, 2, of the wheel, which is suitably serrated, and the other flange 3, forming a housing for the inner member.

This flange 3, where it is bent away from the line of the body portion, at 5, is pressed slightly toward the hub or axial line, forming a bulge, the purpose of which will be described later.

The numeral 4 designates the inner member and this is also formed with two inwardly projecting flanges 7, the inner one forming the hub of the wheel and the outer one being pressed into the form of a toothed gear surface 9.

At the base of these teeth, the flange is also pressed slightly towards the axial centre, to coincide with the slight bulge 5 in the other member.

The two members, when placed into position with relation to each other, as shown, are subjected to pressure, at the points 5, and this jointure, by pressure, between the two members, will not only firmly fix them securely together, but will insure aded strength in both a radial and a lateral direction.

It will be understood that both the inner and outer members of the wheel are pressed from sheet metal, in the form shown in the drawing, and they are then firmly joined together by pressure at the points indicated, to form, as a unitary structure, a relatively light, unbreakable, internally geared lawn mower wheel.

Having thus fully described our invention, what we claim and desire to secure by Letters Patent is:

1. A sheet metal, internally geared lawn mower wheel, comprising an inner annular member having two inwardly projecting flanges, the inner one of which forms the wheel hub, an outer annular member having two inwardly projecting flanges the outer one of which forms the wheel tread, the inner flange of the outer member and the outer flange on the inner member, being pressed together to join the two members in a unitary structure.

2. A lawn mower wheel made from two annular members pressed from sheet steel, one member having a flange to form the wheel tread and the other member having a flange to form the wheel hub, and each member having an additional flange, one of which has teeth pressed into it while the other acts as a housing therefor, the two being pressed together to join the two wheel members to form a unitary structure.

In testimony whereof we affix our signatures.

HOWARD S. LEWIS.
CHARLES KACHEL.